(12) United States Patent
Van Den Bossche

(10) Patent No.: US 6,804,013 B2
(45) Date of Patent: Oct. 12, 2004

(54) OPTICAL ELEMENT

(75) Inventor: Alex Van Den Bossche, Walshoutem (BE)

(73) Assignee: Krypton Electronic Engineering N.V., Leuven (BE)

( * ) Notice: Subject to any disclaimer, the term of this patent is extended or adjusted under 35 U.S.C. 154(b) by 0 days.

(21) Appl. No.: 10/182,139

(22) PCT Filed: Jan. 26, 2001

(86) PCT No.: PCT/BE01/00013

§ 371 (c)(1),
(2), (4) Date: Jul. 26, 2002

(87) PCT Pub. No.: WO01/55763

PCT Pub. Date: Aug. 2, 2001

(65) Prior Publication Data

US 2002/0191196 A1 Dec. 19, 2002

(30) Foreign Application Priority Data

Jan. 26, 2000 (BE) .......................... 2000/0058

(51) Int. Cl.⁷ ............................................. G01B 11/14
(52) U.S. Cl. .................... 356/614; 346/107 R; 346/160
(58) Field of Search ........................ 356/614, 621–622; 250/214.1, 214 P, 214 LA, 214 PL, 214 VT, 213 VT; 385/100–112, 120; 257/69, 90, 432; 346/107 R, 160

(56) References Cited

U.S. PATENT DOCUMENTS 3,649,837 A  *  3/1972  Lehovec .......................... 257/4
3,881,104 A  *  4/1975  Donjon et al. ......... 250/214 VT
3,920,992 A  * 11/1975  Van den Bogaert et al. .. 378/28
4,741,595 A      5/1988  Onoda et al.
4,820,013 A  *  4/1989  Fuse ........................... 385/120
4,827,290 A      5/1989  Yoritomo et al.
4,874,957 A  * 10/1989  Sasaki et al. ............. 250/208.1
5,005,029 A  *  4/1991  Fuse .......................... 347/238
5,102,226 A      4/1992  Yoshimura et al.
6,529,281 B2 *  3/2003  Takeshita et al. ........... 356/614

FOREIGN PATENT DOCUMENTS

EP      0 391 882          3/1990
EP      0 391 882 A3       3/1990
EP      0 819 954 A3       1/1998
EP      0 819 954 A2       1/1998
EP      0 896 202 A3       2/1999
EP      0 896 202 A2       2/1999

OTHER PUBLICATIONS

Patent Abstracts of Japan—Publication No. 61123806, Publication Date Nov. 6, 1986, Applicant—Hitachi Ltd, Inventor: Onoda Seiichi, Title: "Electrooptic Circuit Element Substrate".
Patent Abstracts of Japan—Publication No. 61241713, Publication Date Oct. 28, 1986, Applicant—Hitachi Ltd, Inventor: Yano Masao, Title: "Substrate for Electrical and Optical Circuit Element".

\* cited by examiner

Primary Examiner—Frank G. Font
Assistant Examiner—Sang H. Nguyen
(74) Attorney, Agent, or Firm—Browdy and Neimark, P.L.L.C.

(57) ABSTRACT

Use of an optical element (1) in an optical measuring system, and such a measurement system, with a camera, whereby this optical element (1) contains a light source (2) with an active side (4) which lights up when an electric tension is applied via electric contacts (9,13) provided to this end, whereby this light source is mounted against a translucent wall (3), such that the light of the active side (4) can be seen through this wall (3), and whereby this translucent wall (3) is formed of transparent fibers (5) placed side by side in a parallel manner.

15 Claims, 1 Drawing Sheet

OPTICAL ELEMENT

The invention concerns an optical element containing a light source with an active side which lights up when an electric tension is applied via electric contacts provided to this end, whereby said light source is mounted against a translucent wall, such that the light of the above-mentioned active side can be seen through this wall.

According to the present state of the art, optical elements of this type contain what is called a light-emitting diode also called LED chip, which is mounted on a metal housing and which is protected by means of a transparent epoxy layer.

These existing elements are disadvantageous, however, in that it is impossible to obtain a homogenous distribution of the produced light intensity. Both the metal housing and the epoxy layer produce interfering phenomena. Thus, in particular in the case of a spherical epoxy layer, this layer may act as a lens. Further, internal reflections in the housing of the LED and in the epoxy layer result in an uncontrolled diffusion of the light coming from the LED.

Temperature variations in the LED due to a varying ambient temperature or changing electric conditions provoke a variation in the emitted light spectrum, which results in an inaccurate perception of the optical element.

These qualities are particularly disadvantageous when such an optical element is used in optical measuring systems where the position of the LED has to be determined by means of a camera. On the basis of the position of the LED is calculated the position and/or orientation of the structure upon which this LED is fixed.

In these optical measuring systems, the optical centre of the LED is determined to allow for an accurate determination of the position, such as for example the centre of gravity of the distribution of the light intensity of the LED. In order to be able to precisely determine a position, it is important that the optical centre of the LED is independent of the angle of detection at which it is perceived, and that the light intensity is as high as possible.

Usually, at least one camera and preferably three cameras are used in such an optical measuring system. A single LED or optical element is observed at different angles by these cameras. A mathematical processor which works in conjunction with these cameras processes the images which are thus formed by said cameras, and on the basis thereof calculates the position of the LED or the optical element.

Thus, the LED's used according to the prevailing techniques are disadvantageous in that the optical centre of the LED varies as a function of the angle of detection, whereby said internal reflections reduce the light intensity, as a result of which the measuring distance and accuracy are relatively restricted.

The invention aims to remedy these disadvantages by making use of an optical element in an optical measuring system, whereby the position of its optical centre, for example the centre of gravity of the distribution of intensity, is independent of the angle of detection, and which, moreover, has practically no internal reflections, so that a high light intensity is obtained.

To this aim, the above-mentioned translucent wall is formed of transparent fibers provided next to one another in a parallel manner which extend diagonally in relation to the above-mentioned wall.

Practically, said fibers form a plate and they extend almost perpendicular to the surface thereof.

According to a preferred embodiment of the optical element according to the invention, said transparent fibers are glass fibers.

According to a specific embodiment of the optical element according to the invention, a non-transparent coating is provided on said wall on the side of the above-mentioned light source, whereby a recess is provided in this coating on said active side, opposite to the light source.

According to a special embodiment of the optical element according to the invention, a first part of the above-mentioned electrically conductive contacts consists of an electrically conductive coating which is provided on said wall on the side of the light source.

According to an advantageous embodiment of the optical element according to the invention, a layer of conductive material is provided on the side of said light source, which extends opposite to said active side of the latter, forming a second part of the above-mentioned electric contacts.

The invention also concerns a measuring group which is used in an optical measuring system containing several optical elements according to the invention.

Further, the invention also concerns the use of the optical element according to the invention in an optical measuring system.

Other particularities and advantages of the invention will become clear from the following description of a specific embodiment of the optical element according to the invention; this description is given as an example only and does not restrict the scope of the claimed protection in any way; the reference figures used hereafter refer to the accompanying drawings.

In the different figures, the same reference figures concern identical or analogous elements.

Figure 1:
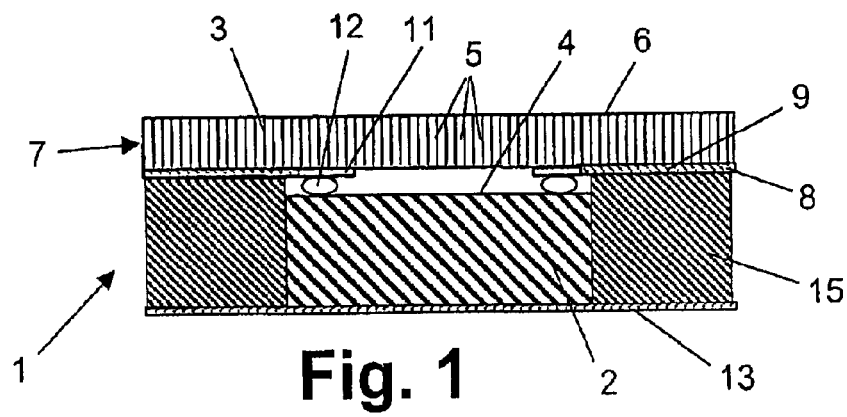
FIG. 1 is a schematic cross section of a part of an optical element according to the invention.
Figure 2:
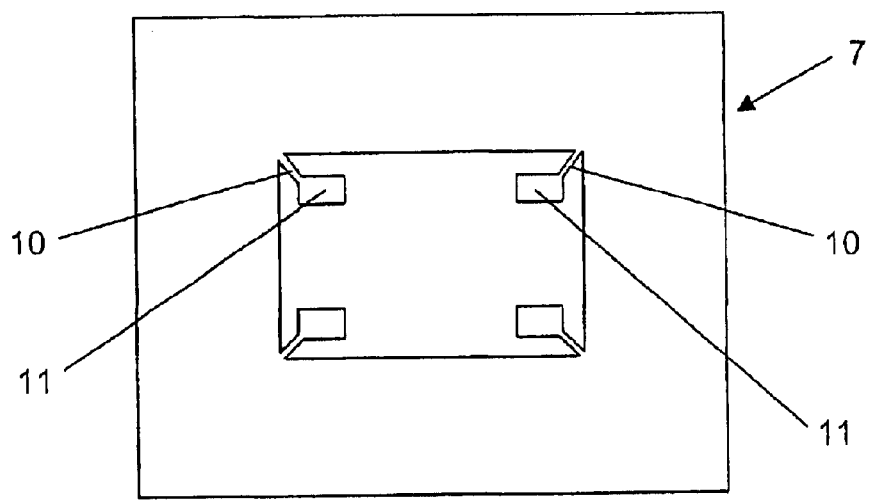
FIG. 2 is a schematic top view of the part concerned of an optical element according to the invention.

The optical element 1 according to the invention, as represented in FIG. 1, contains a light source 2 and a protective translucent wall 3. The light source consists of a conventional LED chip 2 with an active side 4. When an electric tension is applied to the chip 2, the active side 4 will emit light having a certain intensity. Further, the dimensions of such a chip 2 are for example 0.7×0.7 mm, and its thickness is 0.5 mm.

De chip 2 is fixed to the above-mentioned wall 3 according to what is called the "flip chip" technique, known as such, whereby its active side 4 is directed towards said wall 3. Thus, the light which is produced by the chip 2 can be perceived through this wall 3.

According to the invention, the wall 3 consists of transparent fibers 5 provided next to one another in a parallel manner. These fibers can be made of plastic, for example, but they preferably consist of glass fibers.

Thus, the corresponding far ends of these fibers 5 are directed towards the active side 4 of the chip 2, whereas the other far ends of the fibers 5 together form a plane 6. As the light coming from the chip 2 is guided through the fibers 5, this light is perceived at said plane 6, which forms a homogenous, light-emitting surface, so that the light source 2 seems to be situated on the plane 6.

The transparent fibers 5 preferably have a diameter of 3 to 40 $\mu$m, in particular a diameter between 5 and 15 $\mu$m, and in particular a diameter of almost 10 $\mu$m.

Further, these fibers 5 preferably have a length between 0.2 and 1.5 mm. It was found that fibers 5 having a length of more than 20 mm are less interesting. Good results were obtained with fibers 5 having a length of almost 1 mm.

As is shown in FIG. 1, said fibers 5 extend according to a flat plate 7 and thus form this plate 7 with said plane 6, whereby the fibers 5 extend almost perpendicular to the plane 6. The thickness of this plate 7 is almost equal to the length of the fibers 5 and preferably amounts to almost 1 mm. Such a plate is also called a "faceplate".

Such fibers 5 and what are called "faceplates" are known as such and are manufactured among others by the company "Schott Fiber Optics, Inc.", 122 Charlton Street, Southbridge, Mass. 01550, U.S.A.

In order to avoid that the light intensity which is perceived through the above-mentioned wall 3, in particular the plate 7, is not homogenous, it is provided with a non-transparent coating 8. In this coating 8 is provided a recess opposite to said light source. Thus is formed a diaphragm which makes sure, for example, that possible interferences in the light intensity occurring on the edge of the above-mentioned active side 4 are not perceived through the wall 3.

In the embodiment of the optical element according to the invention, as is represented in FIG. 1, this coating 8 is provided on the side of the wall 3 where the chip 2 is situated.

In order to be able to apply an electric tension onto the optical element 1 according to the invention, it is provided with electric contacts 9 and 13.

A first part of these electric contacts is formed of an electrically conductive coating which, in the embodiment of the optical element 1 from FIG. 1, consists of the above-mentioned non-transparent coating 8. This coating 8 preferably consists of a metal layer.

The coating 8 is connected via conductors 10 to four electric contact surfaces 11 which are situated inside said recess on the wall 3, and which make contact to four corresponding junctions 12 on the upper surface of the chip 2.

Further, a second part of the electric contacts is formed of a layer of conductive material 13 provided on the side of the chip 2, which extends opposite to its active side 4 and which is electrically conductive. This electrically conductive layer 13, as is represented in FIG. 1, consists of a small metal plate.

The layer 13 also has a good thermal conductivity, such that heat produced by the LED chip 2 is removed via this layer 13, as a result of which the chip 2 is cooled. This heat removal guarantees an excellent thermal stability of the chip, so that the produced light remains constant and homogenous, and its spectrum is almost invariable.

According to a particularly interesting embodiment of the optical element according to the invention, which is not represented in the figures, means are fixed to said layer 13 which make it possible to cool and/or possibly heat the light source 2. These means comprise an electric component with what is called a Peltier element. Such electric components are known as such. This Peltier element is fixed to the layer 13 with its so-called "cold side", whereas its so-called "hot side" is provided with cooling fins which make it possible to dissipate the heat to the surroundings. Such means make it possible to keep the temperature of the light source at an almost constant level by sending an appropriate electric current through said Peltier element.

Thus, according to the invention, is obtained an optical element with an almost constant temperature, and which consequently emits a constant colour spectrum, which allows for very accurate optical measurements.

According to a variant of the embodiment, said means are mounted directly on the light source 2, and the above-mentioned layer 13 is not provided.

Further, as represented in FIG. 1, the chip 2 is laterally surrounded by a non-transparent and electrically insulating material 15, such as for example an epoxy resin. This insulating material extends between said plate 7 and the layer of conductive material 13, such that the chip 2 is entirely cut off from the environment.

Figure 3:
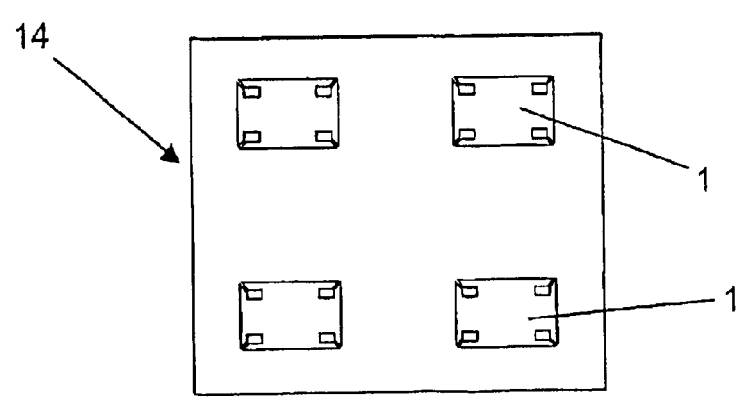
FIG. 3 is a schematic top view of a part of a measuring group according to the invention.

FIG. 3 represents a measuring group 14 for an optical measuring system. This measuring group 14 contains four different optical elements 1 according to the invention, which are mounted on a single plate 7 in the above-described manner. Thus is obtained a measuring group 14 in which the mutual positions of the different optical elements 1 are fixed, and which has to be mounted on a structure in order to determine the position of this structure by means of an optical measuring system. Naturally, the measuring group 14 may contain more or less than four optical elements 1 according to the invention.

The use of the optical element 1 according to the invention in an optical measuring system offers the advantage that, irrespective of the angle at which a camera observes the element, its optical centre is always situated at exactly the same absolute position. Thus, it is possible to perform very accurate measurements. On top of that is obtained a great light intensity, allowing for measurements at large distances.

Further, it is possible to sterilise the optical element according to the invention, for example in an autoclave, without any danger of damaging it and without its optical qualities being affected. Thus, the optical element can be used in an environment where it is very important that the equipment is sterile.

Naturally, the invention is not restricted the above-described embodiments of the optical element according to the invention. Thus, for example, the transparent fibers forming the above-mentioned plate at a certain angle, different from a right angle, can be provided in relation to the surface thereof. Possibly, also other light sources than a semiconductor chip can be used in the optical element according to the invention.

What is claimed is:

1. Use of an optical element (1) in an optical measuring system with a camera and a mathematical processor for calculating the position of said optical element (1) which is perceived by said camera, whereby on basis of the position of said optical element (1) is calculated the position and/or orientation of a structure upon which said optical element (1) is fixed, whereby said optical element contains a light source (2) with an active side (4) which lights up when an electric tension is applied via electric contacts (9,13) provided to enable applying said electric tension, whereby said light source is mounted against a translucent wall (3), such that the light of the above-mentioned active side (4) can be seen through said wall (3), characterised in that said translucent wall (3) is formed of transparent fibers (5) placed side by side in a parallel manner.

2. Use of an optical element according to claim 1, characterised in that said fibers form a plate (7) and extend almost perpendicular to the surface (6) of the plate (7).

3. Use of an optical element according to claim 1, characterised in that said transparent fibers (5) are glass fibers.

4. Use of an optical element according to claim 1, characterised in that said light source (2) contains an electric semiconductor, in particular a chip.

5. Use of an optical element according to claim 1, characterised in that a non-transparent coating (8) is provided on the above-mentioned wall (3), on the side of the above-mentioned light source (2), whereby a recess is provided in this coating (8) on said active side (4), opposite to the above-mentioned light source (2).

6. Use of an optical element according to claim 1, characterised in that a first part of the above-mentioned electric contacts consists of an electrically conductive coating (9) which is provided on said wall (3) on the side of the light source (2).

7. Use of an optical element according to claim 6, characterised in that said non-transparent coating (8) is formed of the conductive coating (9).

8. Use of an optical element according to claim 6, characterised in that, on the side of said light source (2) which extends opposite to said active side (4) of the light source (2), is provided a conductive layer (13) which forms a second part of the above-mentioned electric contacts.

9. Use of an optical element according to claim 1, characterised in that means are provided to keep the temperature of the above-mentioned light source (2) almost constant.

10. Use of an optical element according to claim 1, characterised in that the above-mentioned light source (2) is laterally surrounded by a non-transparent and electrically insulating material (15), such as for example an epoxy resin.

11. Optical measuring system with a camera which works in conjunction with an optical element (1) and a mathematical processor for calculating the position of said optical element (1) which is observed by said camera, whereby on basis of the position of said optical element (1) is calculated the position and/or orientation of a structure upon which said optical element (1) is fixed, and whereby the optical element contains a light source (2) with an active side (4) which lights up when an electric tension is applied via electric contacts (9,13) provided to enable applying said electric tension, and whereby this light source is mounted against a translucent wall (3), such that the light of said active side (4) can be seen through said wall (3), characterised in that said translucent wall (3) is formed of transparent fibers (5) placed side by side in a parallel manner.

12. Method for determining at least one of the position and orientation of a structure to which at least one light emitting element is fixed, said method comprising:
 obtaining, with at least one camera, at least one image of at least part of the structure that contains the at least one element; and
 supplying data derived from the image to a mathematical processor, calculating the position of the at least one element in the image and, on the basis of the calculated position of the at least one element, calculating at least one of the position and orientation of the structure,
 wherein the at least one element contains a light source with an active side which lights up when an electric voltage is applied to the at least one element, the at least one element is mounted against a translucent wall, such that the light from the active side can be seen through the wall (3), and the translucent wall is formed of transparent fibers placed side by side in a parallel manner.

13. The method of claim 12 wherein the at least one element includes a plurality of elements fixed to the structure at locations that are spaced apart from one another, and said step of obtaining at least one image comprises obtaining an image of all of said elements.

14. The method of claim 13 wherein the at least one camera includes a plurality of cameras spaced apart from one another, said step of obtaining at least one image comprises obtaining a respecive image from each of the cameras, and said step of supplying data comprises supplying data derived from the images obtained by all of the cameras.

15. The method of claim 12 wherein the at least one camera includes a plurality of cameras spaced apart from one another, said step of obtaining at least one image comprises obtaining a respecive image from each of the cameras, and said step of supplying data comprises supplying data derived from the images obtained by all of the cameras.

* * * * *